United States Patent
Chun et al.

(10) Patent No.: US 8,243,667 B2
(45) Date of Patent: Aug. 14, 2012

(54) METHOD FOR TRANSMITTING SCHEDULING REQUEST EFFECTIVELY IN WIRELESS COMMUNICATION SYSTEM

(75) Inventors: Sung-Duck Chun, Gyeonggi-Do (KR);
Seung-June Yi, Gyeonggi-Do (KR);
Sung-Jun Park, Gyeonggi-Do (KR);
Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 568 days.

(21) Appl. No.: 12/361,176

(22) Filed: Jan. 28, 2009

(65) Prior Publication Data

US 2009/0201868 A1   Aug. 13, 2009

Related U.S. Application Data

(60) Provisional application No. 61/024,193, filed on Jan. 28, 2008, provisional application No. 61/025,311, filed on Feb. 1, 2008, provisional application No. 61/026,119, filed on Feb. 4, 2008, provisional application No. 61/037,309, filed on Mar. 17, 2008, provisional application No. 61/039,095, filed on Mar. 24, 2008.

(30) Foreign Application Priority Data

Jan. 23, 2009 (KR) .................. 10-2009-0006355

(51) Int. Cl.
*H04W 28/16* (2009.01)
(52) U.S. Cl. ...................................... 370/329
(58) Field of Classification Search .............. 370/329
See application file for complete search history.

(56) References Cited

U.S. PATENT DOCUMENTS

| 2001/0031638 A1 | 10/2001 | Korpela et al. |
| 2006/0062237 A1 | 3/2006 | Kim |
| 2008/0186892 A1* | 8/2008 | Damnjanovic ............... 370/311 |
| 2009/0176502 A1* | 7/2009 | Kuo ............................ 455/450 |

FOREIGN PATENT DOCUMENTS

| EP | 1286564 A1 | 2/2003 |
| EP | 1771024 A1 | 4/2007 |

OTHER PUBLICATIONS

3GPP TS 36.321 v8.0.0 (Dec. 2007), 3rd Generation Partnership Project; Technical Specification Group Radio Access Network; Evolved Universal Terrestrial Radio Access (E-UTRA) Medium Access Control (MAC) protocol specification (Release 8), pp. 1-23.*
3GPP TS 36.321 version 9.3.0 Release 9, Jul. 2010, p. 25, Section 5.4.4.*

(Continued)

*Primary Examiner* — Melvin Marcelo
(74) *Attorney, Agent, or Firm* — Birch, Stewart, Kolasch & Birch, LLP

(57) ABSTRACT

The present invention relates to a wireless communication system providing a wireless communication and a mobile terminal. During data communication between a base station and a terminal in a long term evolution (LTE) system, while the terminal performs a random access channel (RACH) procedure for requesting a radio resource allocation from the base station, if the terminal is allocated with a radio resource using its radio terminal identifier, the terminal is allowed to appropriately select a radio resource, thereby preventing the consumption of radio resources and increasing efficiency.

8 Claims, 7 Drawing Sheets

OTHER PUBLICATIONS

3GPP: "3rd Generation Partnership Project; Technical Specification Group Radio Access Network; User Equipment (UE) procedures in idle mode and procedures for cell reselection in connected mode (Release 8)," 3GPP TS 25.304 V8.0.0, [Online] Dec. 2007, pp. 1-41, XP002524363, Retrieved from the Internet: URL:http://www.3gpp.org/ftp/Specs/archive/25_series/25.304/> [retrieved on Apr. 20, 2009].

LG Electronics Inc: "Correction to HCS," Discussion, Decision, 3GPP TSG-RAN WG2 #61bis, Mar. 31-Apr. 4, 2008, Shenzhen, China, 6.2, R2-081566, pp. 1-18.

* cited by examiner

METHOD FOR TRANSMITTING SCHEDULING REQUEST EFFECTIVELY IN WIRELESS COMMUNICATION SYSTEM

TECHNICAL FIELD

The present invention relates to a method for communicating data between a base station and a terminal in a long term evolution (LTE) system, and more particularly, to avoiding consumption of radio resources and enhancing efficiency, by allowing an appropriate selection of radio resources if the terminal is allocated with the radio resources using its radio terminal identifier during an RACH procedure when the terminal requests a radio resource allocation from the base station.

BACKGROUND ART

FIG. 1 illustrates a network architecture of an Evolved Universal Mobile Telecommunications System (E-UMTS) as a mobile communication system having the related art and the present invention applied thereto. The E-UMTS system has evolved from the existent UMTS system and its basic standardization is undergoing in 3GPP. Such E-UMTS system may also be referred to as a Long Term Evolution (LTE) system.

E-UMTS network may be divided into E-UTRAN and Core Network (CN). The E-UTRAN includes a terminal (User Equipment, referred to as 'UE' hereinafter), a base station (referred to as 'eNode B' hereinafter), a Serving Gateway (S-GW) located at the end of the network to be connected to an external network, and a Mobility Management Entity (MME) for managing the mobility of the UE. One or more cells may exist in one eNode B.

FIG. 2 illustrates a radio interface protocol architecture between UE and base station based on the 3GPP radio access network standard. The radio interface protocol has horizontal layers comprising a physical layer, a data link layer and a network layer, and has vertical planes comprising a user plane for transmitting data information and a control plane for transmitting a control signaling. The protocol layers can be divided into a first layer (L1), a second layer (L2) and a third layer (L3) based on three lower layers of an Open System Interconnection (OSI) standard model widely known in communications systems.

Hereinafter, each layer in the radio protocol control plane in FIG. 2 and a radio protocol user plane in FIG. 3 will be described.

A first layer, as a physical layer, provides an information transfer service to an upper layer using a physical channel. The physical layer is connected to its upper layer, called a Medium Access Control (MAC) layer, via a transport channel. The MAC layer and the physical layer exchange data via the transport channel. Data is transferred via a physical channel between different physical layers, namely, between the physical layer of a transmitting side and the physical layer of a receiving side.

The MAC layer located at the second layer provides a service to an upper layer, called a Radio Link Control (RLC) layer, via a logical channel. The RLC layer of the second layer supports reliable data transmissions. A Packet Data Convergence Protocol (PDCP) layer of the second layer is used to efficiently transmit IP packets, such as IPv4 or IPv6, on a radio interface with a relatively small bandwidth. For this purpose, the PDCP layer reduces the size of an IP packet header which is relatively great in size and includes unnecessary control information, namely, performs a function called header compression. Also, the PDCP layer is used to encode C-plane data, for example, an RRC message. The PDCP layer 3 may also be used to encode U-Plane data.

A Radio Resource Control (RRC) layer located at the lowermost portion of the third layer is only defined in the control plane. The RRC layer controls logical channels, transport channels and physical channels in relation to configuration, re-configuration and release of Radio Bearers (RBs). Here, the RB signifies a service provided by the second layer of the radio protocols for data transmissions between the terminal and the E-UTRAN.

Hereinafter, a random access channel (RACH) will be described. The RACH channel may be used to transmit uplink data with a short length, particularly, used when a terminal without being allocated with a dedicated radio resource has to transmit a signaling message or user data on uplink. Alternatively, the RACH channel may be used by a base station to indicate the performance of an RACH procedure to a terminal.

Hereinafter, a random access channel (RACH) procedure provided in an LTE system will be described. The RACH procedure provided in the LTE system may be divided into a contention based (RACH) procedure and a non-contention based RACH procedure. The division may depend on whether a random access preamble used in the RACH procedure is selected directly by a terminal or by selected a base station.

In the non-contention based RACH procedure, a terminal may use a specific random access preamble directly allocated thereto by a base station. Therefore, when the base station allocates the specific random access preamble only to the terminal, the random access preamble may be used only by the terminal, and thus other terminals may not use it. Hence, an one-to-one (1:1) relation between the random access preamble and the terminal using the random access preamble may exist, whereby it can be said that there is no contention. In this case, the base station can identify a terminal having transmitted a random access preamble as soon as receiving the random access preamble. So, the non-contention based RACH procedure may be efficient from this perspective.

On the other hand, in the contention based RACH procedure, a terminal may randomly select a random access preamble for transmission, among random access preambles. Accordingly, a plurality of terminals may have a chance of always using the same random access preamble. Therefore, even if a base station receives a specific random access preamble, it cannot identify which terminal has transmitted the random access preamble.

In general, a terminal may carry out a random access channel (RACH) procedure in the following cases, namely, 1) when the terminal initially accesses a base station because it has no RRC connection established with the base station, 2) when the terminal initially accesses a target cell during a handover procedure, 3) upon being requested by a command from the base station, 4) when uplink data is generated under the condition that an uplink (time) synchronization is not matched or a designated radio resource which is used to request for a radio resource has not been allocated, and 5) during a restoration procedure at the time of radio link failure or handover failure.

Based upon the above description, FIG. 4 illustrates operations between a terminal and a base station during a contention based random access channel (RACH) procedure.

First, in a contention based random access, a terminal randomly selects one random access preamble from a group of random access preambles indicated by system information or handover command. The terminal then selects a physical random access channel (PRACH) resource capable of transmitting the random access preamble so as to transmit the random access preamble (Step 1). Such preamble is referred to as 'RACH MSG 1'.

After transmitting the random access preamble, the terminal attempts to receive a response message in response to the random access preamble within a random access response reception window indicated by the system information or handover command (Step 2). In more detail, the random access response information may be transmitted in the format of MAC protocol data unit (PDU). The MAC PDU may be transmitted via a physical downlink shared channel (PDSCH). A physical downlink control channel (PDCCH) may also be transmitted in order for the terminal to appropriately receive information transmitted over the PDSCH. That is, the PDCCH may include information related to a terminal to receive the PDSCH, information related to frequency and time of PDSCH radio resources, a transmission format of the PDSCH, and the like. Here, if the terminal has successfully received the PDCCH coming to the terminal itself, then the terminal properly receives a random access response transmitted over the PDSCH according to the information included in the PDCCH. The random access response may include a random access preamble identifier (ID), a UL grant (uplink radio resource), a temporary cell-radio network temporary identifier (C-RNTI) and a timing advance command (or time alignment command, or time sync compensation value). Since one random access response may include random access response information for one or more terminals, the random access preamble identifier is required to indicate to which terminal the UL grant, the temporary C-RNTI and the timing advance command information are available. The random access preamble identifier matches with the random access preamble selected by the terminal in Step 1.

Here, when the terminal receives a random access response available thereto, then the terminal processes (handles) each of the information included in the random access response. That is, the terminal may apply the timing advance command and stores the temporary C-RNTI. Also, the terminal uses the UL grant to send data stored in its buffer or newly generated data to the base station (Step 3). Here, the base station cannot determine which terminals perform the RACH procedure during the contention based RACH procedure, but should identify such terminals for resolving the contention layer. Hence, the UL grant should essentially include a terminal identifier among other data (hereinafter, referred to as 'message 3). Here, there are two methods for including the terminal identifier. A first method is configured such that if a terminal has an available cell identifier already allocated in the corresponding cell before the RACH procedure, the terminal transmits its cell identifier via the UL grant, while the terminal transmits its specific identifier (e.g., S-TMSI or random ID) if the terminal has not been allocated with an available cell identifier before the RACH procedure. In general, the specific identifier is longer than the cell identifier. In Step 3, if the terminal has sent data via the UL grant, the terminal initiates a contention resolution timer.

After transmitting data including its identifier via the UL grant included in the random access response, the terminal waits for an instruction from a base station for contention resolution. That is, the terminal attempts to receive the PDCCH for receiving a specific message (Step 4). Here, the PDCCH reception may be performed by two methods. As aforementioned, if the terminal identifier transmitted via the UL grant is the cell identifier, the terminal may attempt the PDCCH reception using its cell identifier. On the other hand, if the identifier is the specific identifier, the terminal may attempt the PDCCH reception using the temporary C-RNTI included in the random access response. Afterwards, for the former, if the terminal has received the PDCCH via its cell identifier before the expiration of the contention resolution timer, then the terminal may determine that the RACH procedure has normally been performed so as to terminate the RACH procedure. For the latter, if the terminal has received the PDCCH via the temporary C-RNTI before the expiration of the contention resolution timer, the terminal may check data (hereinafter, referred to as message 4) sent over the PDSCH instructed by the PDCCH. If its specific identifier is included in contents of the data, then the terminal may determine that the RACH procedure has normally been performed, so as to terminate the RACH procedure. Here, a message or MAC PDU received in Step 4 is usually referred to as an RACH MSG 4.

Hereinafter, description will be given of a method in which a terminal receives downlink data in an LTE system. FIG. 5 is an exemplary view illustrating a radio resource allocation according to the related art.

Physical channels may roughly be divided into two channels in downlink, namely, a physical downlink control channel (PDCCH) and a physical downlink shared channel (PDSCH). The PDCCH has no direct relation to the transmission of user data. The PDCCH is rather used to transmit control information required for the application of other physical channels. Briefly explaining, the PDCCH can be used for the control of other physical channels. In particular, the PDCCH is used by a terminal for the transmission of information required to receive the PDSCH. For example, those Information indicating at which transmission time interval data is sent, which frequency band is used to send data, to which terminal data is sent, what size data has, and the like, may be sent over the PDCCH. Thus, each terminal receives the PDCCH at a specific TTI and determines whether data to be received by the terminal itself is sent. If it is informed that the data to be received by the terminal is sent, the terminal further receives the PDSCH using information related to a frequency or the like indicated in the PDCCH. Information on to which terminal (one or plural terminals) PDSCH data is transmitted, how the terminal(s) should receive and decode the PDSCH data and the like, may be included in the PDCCH for transmission.

For example, it is assumed that radio resource information A (e.g., a frequency location) and transmission format information B (e.g., transmission block size information, modulation and coding information and the like) are CRC-masked to a radio network temporary identifier (RNTI) called C to be transmitted over the PDCCH in a specific sub frame. One terminal or two or more terminals staying in a corresponding cell monitor(s) the PDCCH using the RNTI information belonging to the terminal(s). Under the assumption, a CRC error may not occur in a terminal having the RNTI called C when decoding the PDCCH. Therefore, the terminal may decode the PDSCH for data reception by using the transmission format information B and the radio resource information A. On the other hand, under the assumption, the CRC error may occur in a terminal without the RNTI called C when decoding the PDCCH. Therefore, the terminal may not receive the PDSCH.

During the procedure, in order to inform to which terminals radio resources are allocated, the RNTI is transmitted over each PDCCH. Such RNTIs may include a dedicated RNTI and a common RNTI. The dedicated RNTI may be allocated to one terminal, and used for transmission and reception of data of the corresponding terminal. The dedicated RNTI may be allocated to terminals having information registered in a base station. On the other hand, the common RNTI may be used when terminals, of which information have not been registered in the base station so as not to have the dedicated RNTI allocated thereto, transmit and receive data to/from a base station, or used for the transmission of information, such as system information, commonly applied to a plurality of terminals.

As mentioned above, a base station and a terminal construct the E-UTRAN. Radio resources within one cell may be composed of uplink radio resource and downlink radio resource. The base station manages allocation and control of the uplink and downlink radio resources of the cell. That is, the base station determines which radio resource is to be used for which terminal with time information. For example, the base station may determine to allocate a frequency in the range of 100 MHz to 101 MHz to a user 1 after 3.2 seconds, for a downlink data transmission for 0.2 seconds. After the determination, the base station informs the corresponding terminal of such information, such that the terminal can receive the downlink data. Similarly, the base station may determine when and which terminal is allowed to transmit uplink data using how many and which radio resources. The base station may then inform the corresponding terminal of the determination such that the terminal can transmit the uplink data using the radio resources for the corresponding time.

Unlike the related art, the dynamic management of radio resources by the data station allows the efficient use of radio resources. The related art technique is configured such that one terminal keeps using one radio resource during a call connection. This technique is irrational, considering that many services are recently provided based upon an internet protocol (IP) packet. It is because most packet services do not continuously generate packets during a call connection but contain non-transmission intervals during the call connection. In spite of this, the continuous allocation of radio resources to one terminal is inefficient. To solve the problem, the E-UTRAN system employs the aforesaid method for allocating a radio resource to a terminal, while service data exists, only when the terminal needs the radio resource.

In more detail, in order to efficiently use radio resources in the LTE system, the base station should know what kind of data and how many data each user wants to send. For downlink data, it is transferred from an access gateway to the base station. The base station thus knows how many downlink data should be transferred to each user. On the other hand, for uplink data, if a terminal does not inform the base station of information related to uplink data that it wants to send, the base station cannot know how many uplink data each terminal needs. Hence, in order for the base station to appropriately allocate uplink radio resources to terminals, each terminal should provide the base station with information required for scheduling radio resources.

To this end, a terminal informs to the base station if it has data to send, and the base station sends a radio resource allocation message to the terminal based upon the information.

At the process, namely, when the terminal informs the base station that it has data to send, the terminal informs the base station of the amount of data stored in its buffer, which is called as a buffer status report (BSR).

However, the BSR is generated in the format of a MAC control element (MAC CE) and included in a MAC PDU to be transmitted from the terminal to the base station. That is, an uplink radio resource is required for the BSR transmission, which means that uplink radio resource allocation request information for the BSR transmission should be sent. When the BSR is generated, if there is an uplink radio resource allocated, the terminal immediately sends the BSR using the uplink radio resource. However, when the BSR is generated, if there is no uplink radio resource allocated, the terminal performs a scheduling request (SR) procedure (i.e., resource allocation request procedure).

The SR procedure may be divided into two ways, namely, a method using a dedicated scheduling request (D-SR) channel set for a physical uplink control channel (PUCCH) and a method using a RACH procedure. That is, once the SR procedure is triggered, if the terminal has an allocated D-SR channel, then the terminal uses the D-SR channel to send a radio resource allocation request. If the terminal does not have the D-SR channel allocated thereto, then the terminal starts the RACH procedure. In case of using the D-SR channel, the terminal sends a radio resource request allocation signal on uplink via the D-SR channel.

The SR procedure may be continuously performed until the terminal is allocated with a UL-SCH resource.

During the procedure, the BSR sent by the terminal is used to inform the amount of buffer for each logical channel group (LCG), other than sending information related to the amount of buffer for each logical channel. That is, the base station calculates the amount of buffer for each designated group. Maximum four LCGs are defined for one terminal. During the procedure, there are two types of BSR, including long buffer status report (long BSR) and a short buffer status report (short BSR). The long BSR includes information related to the amount of buffer for all of the four LCGs, while the short BSR includes information related to the amount of buffer for one LCG.

The related art radio resource allocation request has the following problem. In general, a plurality of terminals exists in one cell and a base station firstly allocates radio resources to a terminal with a high priority and a channel with a high priority. Therefore, depending on cases, in spite of receiving a radio resource allocation request message or BSR from a specific terminal, the base station may not allocate a radio resource to the terminal. In this case, if the terminal keeps sending the radio resource allocation request, it may cause the consumption of uplink radio resources, which results in an interference with radio resources. In addition, in the above case, while a terminal performs the RACH procedure, the base station may directly allocate a radio resource to the terminal. For example, the terminal may be allocated with a radio resource from the base station using its dedicated identifier after completing Step 2 of the RACH procedure. However, the second message of the RACH procedure includes information related to the allocation of radio resource to a terminal having performed the RACH procedure. In this case, if the terminal continues to perform the RACH procedure, the radio resource allocated using the dedicated identifier is consumed. Also, the D-SR channel is effective only when the terminal has an uplink synchronization. That is, if the terminal does not have the uplink synchronization, even if the terminal uses the D-SR channel, the base station cannot appropriately receive the radio resource allocation request from the terminal. In this case, if the terminal keeps sending the radio resource allocation request without considering such situation, it may only cause the interference with radio resources.

DISCLOSURE OF THE INVENTION

Therefore, one object of the present invention is to provide a method for efficiently requesting a radio resource from a base station with reducing an interference with radio resources as much as possible.

To achieve this and other advantages and in accordance with the purpose of the present invention, as embodied and broadly described herein, there is provided a method of handling a scheduling request (SR) in a wireless communication system, the method comprising: determining whether the scheduling request (SR) is triggered; signaling the SR on an uplink control channel if the uplink control channel is configured to send the SR or initiating a random access channel (RACH) procedure if the uplink control channel is not configured to send the SR; monitoring a downlink control channel; determining whether an identifier of terminal has been received over the downlink control channel; and terminating the triggering of scheduling request (SR) if the identifier of terminal is determined to be received.

To achieve this and other advantages and in accordance with the purpose of the present invention, as embodied and broadly described herein, there is also provided a method of performing a random access channel (RACH) procedure in a wireless communication system, the method comprising: transmitting a random access channel (RACH) preamble; monitoring a downlink control channel after the RACH preamble is transmitted; determining whether an uplink allocated resource has been received over the downlink control channel with an identifier of terminal (C-RNTI), wherein the uplink allocated resource is used for transmitting a next scheduled data; and terminating the RACH procedure if the uplink allocated resource with the identifier of terminal is determined to be received.

MODE FOR INVENTION

Figure 1:
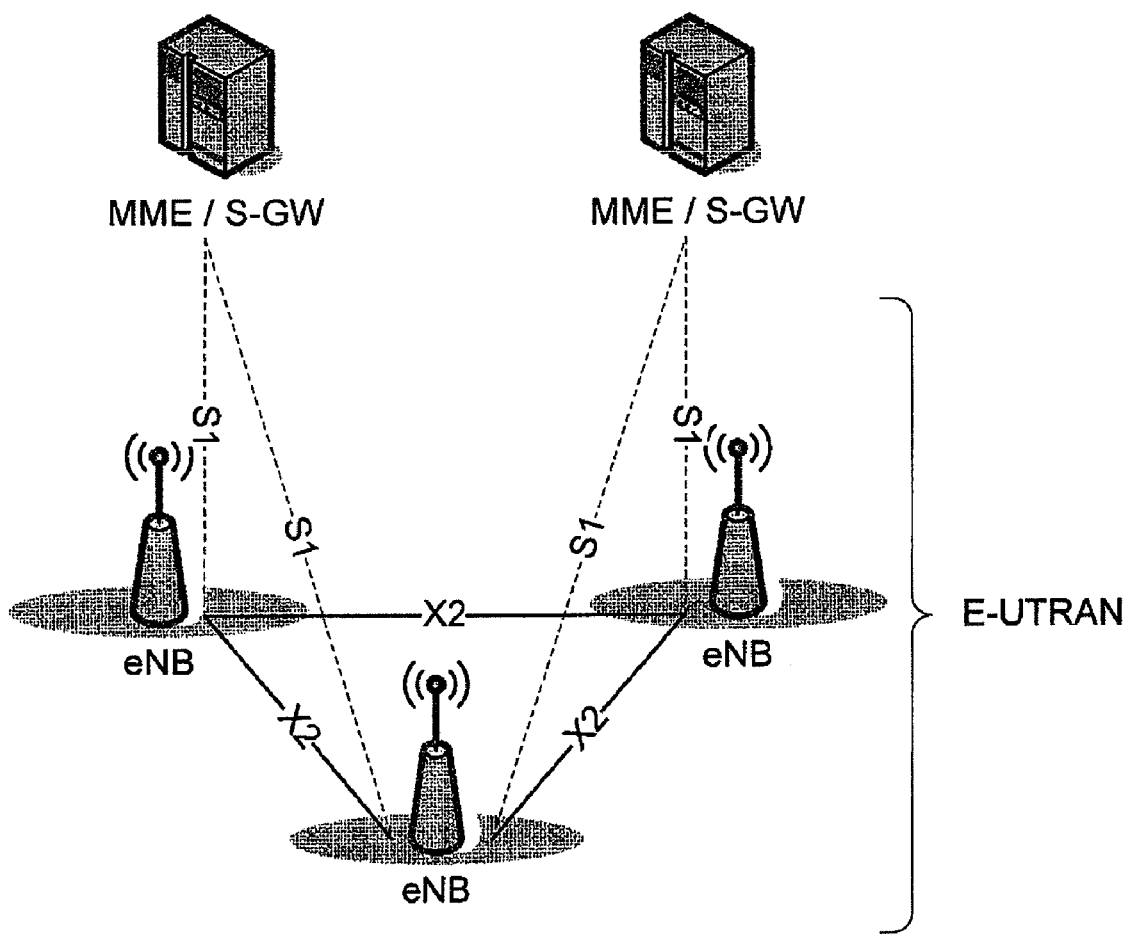
FIG. 1 is a network architecture of E-UMTS as a mobile communication system having the related art and the present invention applied thereto.
Figure 2:
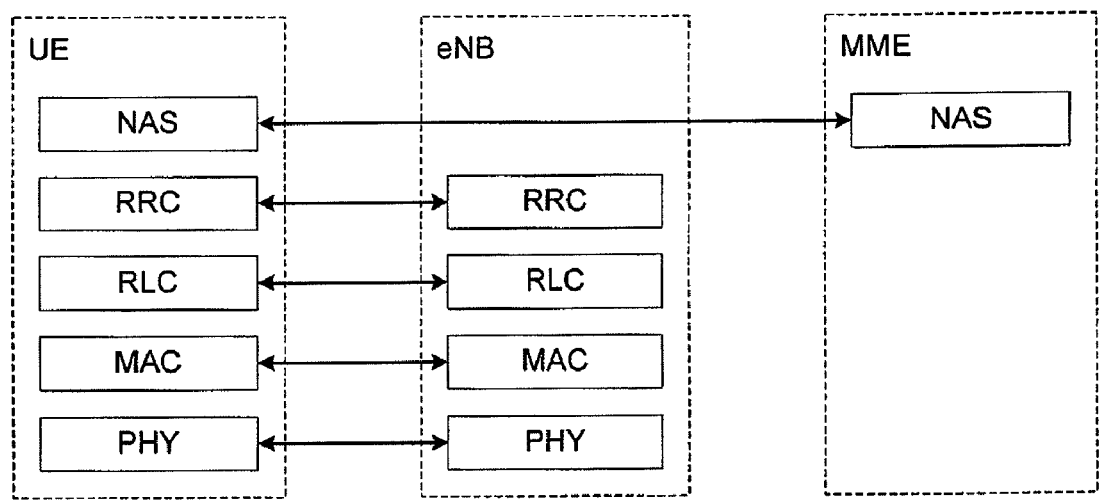
FIG. 2 illustrates a control plane architecture of radio interface protocols between a terminal and a UMTS terrestrial radio access network (UTRAN) based upon the 3GPP radio access network standard.
Figure 3:
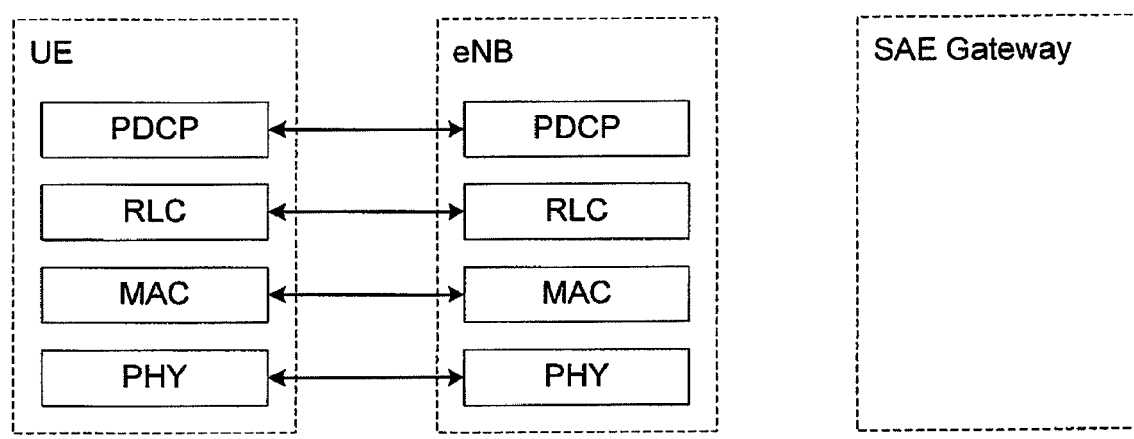
FIG. 3 illustrates a user plane architecture of radio interface protocols between a terminal and a UMTS terrestrial radio access network (UTRAN) based upon the 3GPP radio access network standard.
Figure 4:
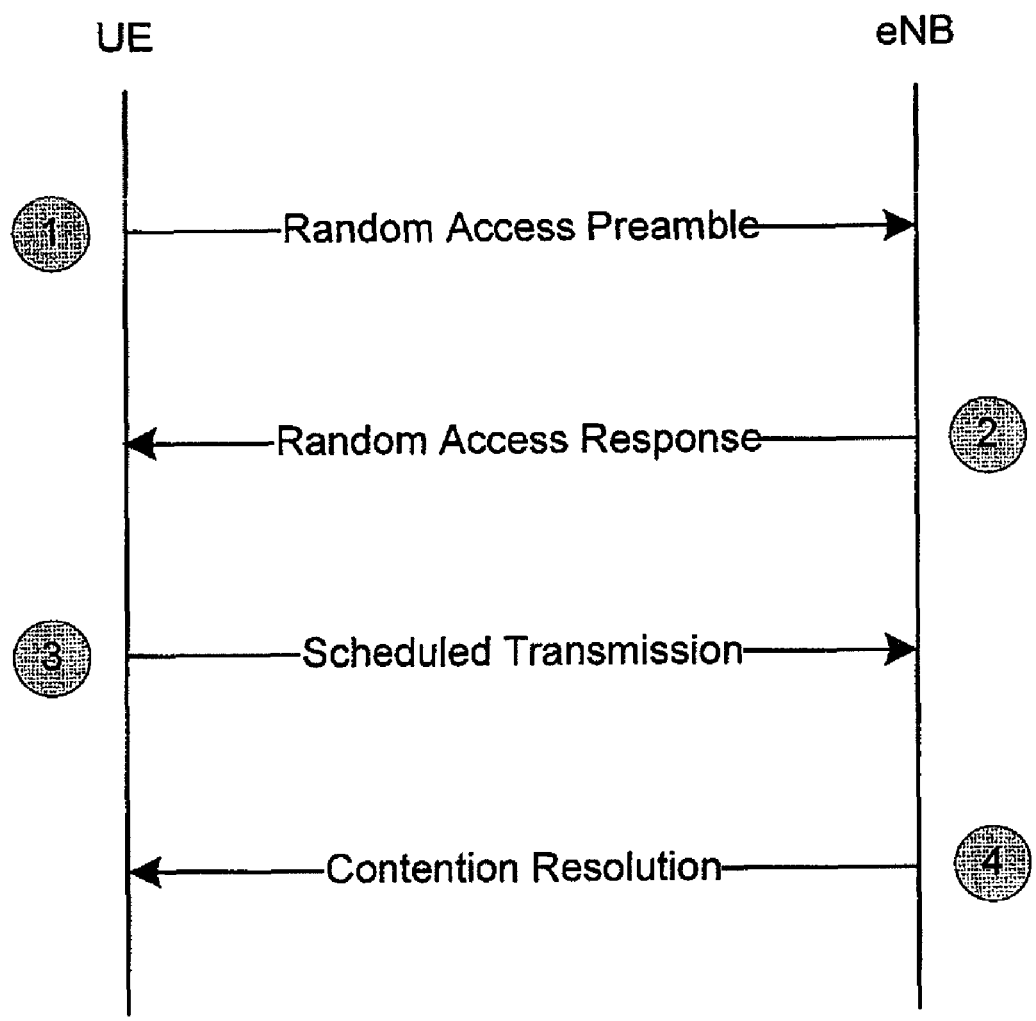
FIG. 4 is an exemplary view illustrating a contention based random access channel (RACH) procedure.
Figure 5:
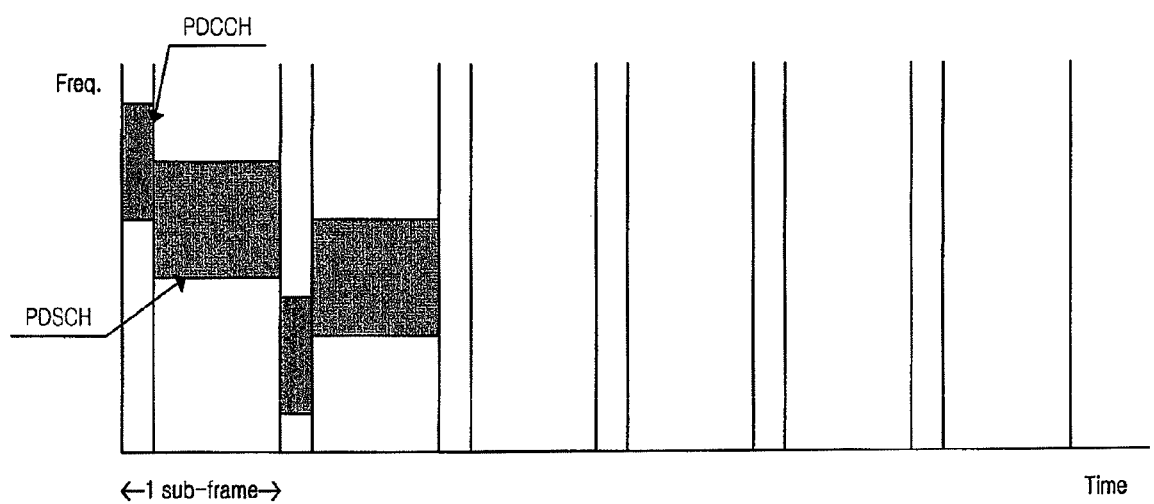
FIG. 5 is an exemplary view illustrating a radio resource allocation according to the related art.

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

As aforesaid, the present invention proposes a method for efficiently requesting a radio resource from a base station with reducing the interference with radio resources as much as possible. To this end, in the present invention, in case where a terminal requests a radio resource from a base station using a D-SR channel, if the terminal is not allocated with an uplink radio resource from the base station until sending a radio resource request to the base station using the D-SR channel for a preset number of times or for a preset time, the terminal may no longer perform the radio resource request procedure using the D-SR channel. Preferably, in this procedure, the terminal transits into a radio resource request procedure using an RACH procedure. In the procedure, when the terminal receives the allocated radio resource from the base station, without using the D-SR channel for the preset number of times yet, the terminal immediately terminates the radio resource request procedure. In this case, the setting of the D-SR channel is released and not used any more.

Also, in order for the terminal to efficiently send a buffer status report (BSR) to the base station, when data newly arrives at a certain logical channel, the present invention proposes to determine whether to send a BSR by considering a priority of the logical channel and priorities of other logical channels.

In detail, a first approach (Approach 1) according to the present invention is described as follows. If data newly comes to the logical channel, of which data is not stored in a buffer of the terminal, the terminal may check a priority A of the logical channel. The terminal also checks a logical channel group including all other logical channels, each of which data is stored in the buffer of the terminal. The terminal inspects the priority B of each of the logical channels belonging to the checked logical channel group, regardless of already having data of the channels in its buffer. The terminal then compares the priority A with the priorities B. If the priority A is higher than any of the priorities B, then the terminal triggers a BSR and sends the triggered BSR to the base station. Preferably, in this process, the comparison may be performed by considering logical channels with the highest priorities in each of logical channel groups.

In detail, a second approach (Approach 2) according to the present invention is described as follows. If new data comes to a logical channel, of which data is not stored in the buffer, the terminal inspects the priority A of the logical channel. The terminal also inspects the priorities of all other logical channels, each of which data is already stored in the buffer. The terminal then compares the priority A with the priorities B. If the priority A is higher than any of the priorities B, then the terminal triggers a BSR and sends the triggered BSR to the base station.

Figure 6:
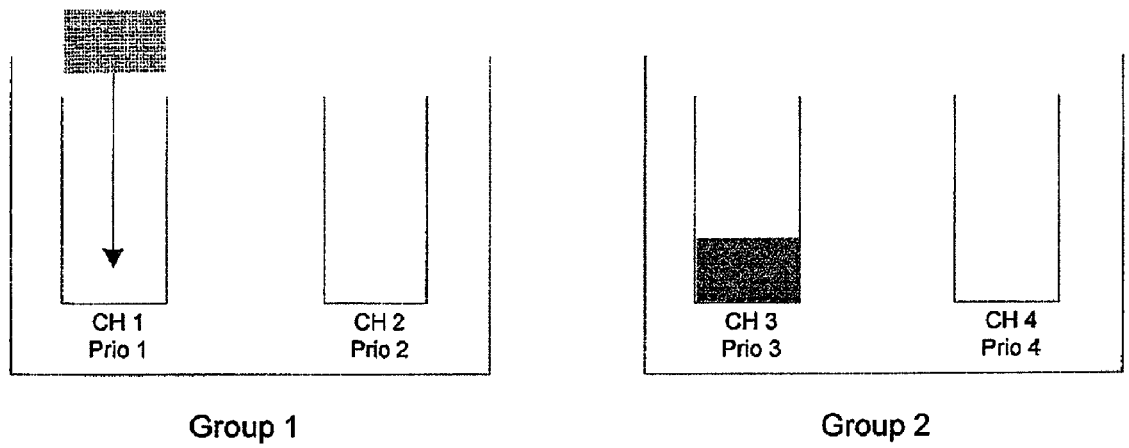
FIG. 6 is an exemplary view showing a method for sending a buffer status report from a terminal to a base station according to the present invention.

FIG. 6 exemplarily illustrates the difference between the result of Approach 1 and the result of Approach 2.

That is, when new data comes to a first logical channel according to Approach 1, since the priority of the first logical channel is not higher than that of any other logical channel (e.g., fourth logical channel), the BSR is not triggered. However, when data comes to the first logical channel according to Approach 2, since the priority of the first logical channel is higher than that of all the other logical channels (e.g., third channel), each of which data is stored in the buffer having data in their buffers, the BSR is triggered.

A third approach (Approach 3) according to the present invention is described in detail as follows. When new data comes to a logical channel, of which data is not stored in the buffer, the terminal inspects the priority A of the logical channel and checks to which logical channel group the corresponding logical channel belongs. Afterwards, the terminal checks logical channels, each of which data is already stored in the buffer, among logical channels belonging to the logical channel group. If buffer information related to the logical channel group or the logical channels are already sent to the base station, the terminal may not trigger a new BSR.

A fourth approach (Approach 4) according to the present invention is described in detail as follows. If new data comes to a logical channel, of which data is not stored in the buffer, the terminal inspects the priority A of the logical channel and checks to which logical channel group the corresponding logical channel belongs. Afterwards, the terminal checks logical channels, each of which data is already stored in the buffer, among logical channels belonging to the logical channel group. If buffer information related to the logical channel group or the logical channels are already sent to the base station, the terminal inspects whether an amount of buffer newly stacked in the logical channel group after the BSR is sent to the base station exceeds a reference value. Accordingly, only when the amount of buffer exceeds the reference value, the terminal triggers a new BSR.

A fifth approach (Approach 5) according to the present invention is described in detail as follows. If new data comes to a logical channel, of which data is not stored in the buffer, the terminal inspects the priority A of the logical channel and checks to which logical channel group the corresponding logical channel belongs. The terminal then checks the priorities B of logical channels, each of which data is already stored in the buffer, among logical channels belonging to the logical channel group. When the priority A is higher than any of the priorities B, the terminal triggers a BSR.

A sixth approach (Approach 6) according to the present invention is described in detail as follows. If new data comes to a logical channel, of which data is not stored in the buffer, the terminal inspects the priority A of the logical channel and checks to which logical channel group the corresponding logical channel belongs. The terminal then checks the priorities B of logical channels belonging to the logical channel group, regardless of the existence of data of the channels in its buffer. When the priority A is higher than any of the priorities B, the terminal triggers a new BSR.

A seventh approach (Approach 7) according to the present invention is described in detail as follows. If new data comes to a logical channel, of which data is not stored in the buffer, the terminal inspects a logical channel with the highest priority A among logical channels belonging to a logical channel group to which the corresponding logical channel belongs. The terminal then inspects a logical channel with the highest priority B among other logical channels belonging to each of preset logical channel groups. The terminal compares the priority A with the priorities B. If the priority A is higher than any of the priorities B, the terminal triggers a BSR and sends the triggered BSR to the base station. Preferably, in the process, logical channels of which data are not stored in the terminal may be excluded from the comparison.

During the process, if BSRs of other logical channel groups are the same and a BSR of a specific logical channel group is changed, the terminal may use a short BSR.

Figure 7:
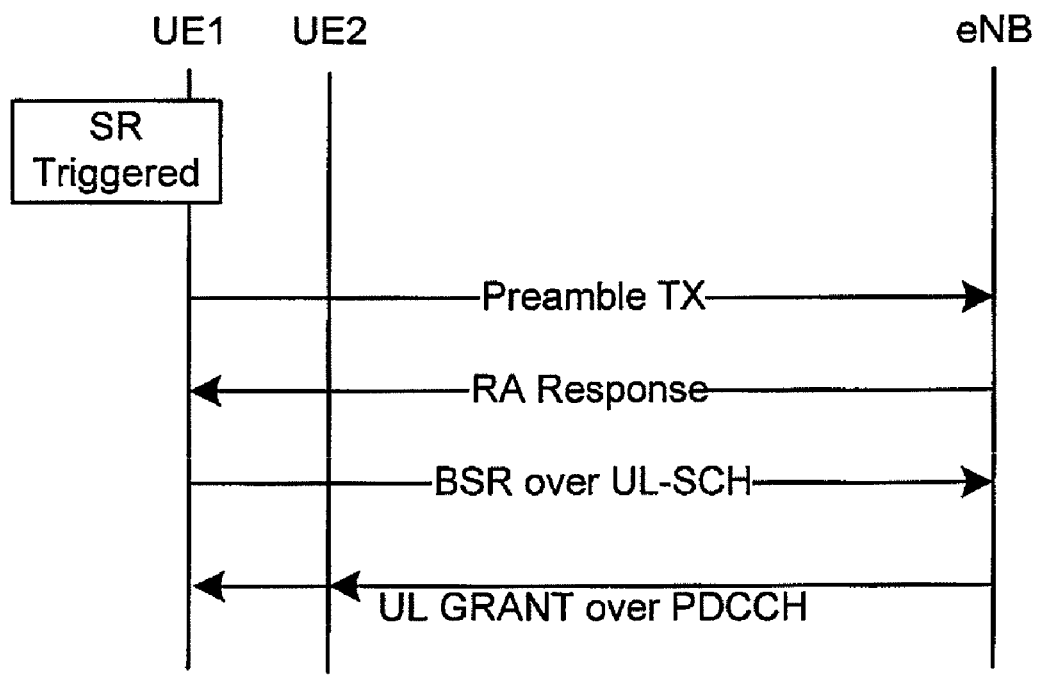
FIG. 7 is an exemplary view showing a method for sending a buffer status report from a terminal and a base station during a random access channel (RACH) procedure according to the present invention.

In addition, in order for the terminal to efficiently send the BSR to the base station in the present invention, when a SR procedure starts, if the terminal has no D-SR channel allocated thereto, then the terminal starts an RACH procedure. At a second step of the RACH procedure, the terminal is allocated with a UL-SCH resource to be used at a third step. However, in the contention based RACH procedure, until the contention resolution is successfully completed at a fourth step, the terminal cannot know whether data sent by the terminal itself has successfully been sent to the base station at the third step. Hence, it is proposed that the terminal having started the SR procedure does not terminate the SR procedure even if being allocated an uplink radio resource at the third step of the RACH procedure. FIG. 7 is an exemplary view showing a method for sending a BSR from a terminal to a base station during a RACN procedure according to the present invention. As shown in FIG. 7, only when the terminal has received a UL-GRANT using its C-RNTI at the fourth step of the RACH procedure, it is considered as the SR procedure is successfully completed. That is, only when its C-RNTI has been received over the PDCCH, the terminal considers that the SR procedure is successfully completed, and thus terminates the SR procedure. If the terminal has not received the UL-GRANT using its C-RNTI at the fourth step of the RACH, the SR procedure is continuously carried out without termination.

In a particular case, depending on an amount of usable radio resources existing in one cell or a scheduling algorithm used by e-NodeB (e-NB), the base station may not allocate a radio resource to a specific terminal, even if the base station recognizes that the specific terminal has data to send. Hence, in this case, if the terminal impatiently sends another BSR or performs the SR procedure, it may cause the consumption of radio resources. Alternatively, even if the terminal is performing the SR procedure or the BSR transmission, the terminal can have to appropriately terminate such operation. Therefore, the present invention proposes that, while performing the RACH procedure due to the transmission of BSR or the SR procedure, if the terminal receives a dedicated radio resource allocated by the base station, namely, if the terminal receives an uplink radio resource using the C-RNTI, the terminal immediately terminates the RACH procedure. Also, the present invention proposes that, in case of the SR procedure being started, if the terminal is allocated with a dedicated radio resource from the base station, namely, until before being allocated with the uplink radio resource using the C-RNTI, the terminal may continuously perform the SR procedure. Preferably, the present invention proposes that when the terminal is allocated at the second step of the RACH with a radio resource to be used at the third step of the RACH and simultaneously allocated with a PDCCH radio resource using its C-RNTI, the terminal may use the radio resource allocated using the C-RNTI. Here, if necessary, the BSR may be sent by using the radio resource. Preferably, when the terminal is allocated at the second step of the RACH with a radio resource to be used at the third step of the RACH and simultaneously allocated with a radio resource using its C-RNTT over the PDCCH, the terminal may use the radio resource allocated at the second step of the RACH. Here, if necessary, the BSR may be sent by using the radio resource.

The present invention provides a method for effectively using radio resources, in order for a terminal to send a buffer status report to a base station or perform a scheduling request (SR) procedure, whereby a terminal can be allocated with a radio resource from the base station more quickly and accurately.

The present invention may provides a method of handling a scheduling request (SR) in a wireless communication system, the method comprising: determining whether the scheduling request (SR) is triggered; signaling the SR on an uplink control channel if the uplink control channel is configured to send the SR or initiating a random access channel (RACH) procedure if the uplink control channel is not configured to send the SR; monitoring a downlink control channel; determining whether an identifier of terminal has been received over the downlink control channel; and terminating the triggering of scheduling request (SR) if the identifier of terminal is determined to be received, wherein the uplink control channel is a Physical Uplink Control Channel (PUCCH), the downlink control channel is a Physical Downlink Control Channel (PDCCH), the step of signaling the SR on the uplink control channel or initiating the RACH procedure is performed when the SR is determined to be triggered, the identifier of terminal is a Cell-Radio Network Temporary Identifier (C-RNTI), and the triggering of the SR is continuously operated if the identifier of terminal is not received.

It can be also said that the present invention may provide a method of performing a random access channel (RACH) procedure in a wireless communication system, the method comprising: transmitting a random access channel (RACH) preamble; monitoring a downlink control channel after the RACH preamble is transmitted; determining whether an uplink allocated resource has been received over the downlink control channel with an identifier of terminal (C-RNTI), wherein the uplink allocated resource is used for transmitting a next scheduled data; terminating the RACH procedure if the uplink allocated resource with the identifier of terminal is determined to be received, and receiving a response message in response to the transmitted RACH preamble, wherein the response message includes a different uplink allocated resource, the downlink control channel is a Physical Downlink Control Channel (PDCCH), the uplink allocated resource is an UL-GRANT, the identifier of terminal is a Cell-Radio Network Temporary Identifier (C-RNTI), the RACH procedure is continuously performed if the uplink allocated resource with the identifier of terminal is not received, and the different uplink allocated resource is discarded if the uplink allocated resource with the identity of the terminal is determined to be received.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of requesting a scheduling request (SR) for a shared uplink control channel resource in a wireless communication system, the method performed by a terminal and comprising:
   determining whether or not the SR is triggered;
   if the SR is determined to be triggered, determining whether or not an existing shared uplink control channel resource is assigned to the terminal's Cell-Radio Network Temporary Identifier (C-RNTI); and
   if no existing shared uplink control channel resource is determined to be available, performing the following operation:
      determining whether or not a Physical Uplink Control Channel (PUCCH) is configured for the terminal;
      if the PUCCH is configured for the terminal, sending the SR via the PUCCH for a predetermined number of time, and monitoring a Physical Downlink Control Channel (PDCCH) for a new shared uplink control channel resource that is assigned to the terminal's C-RNTI; and
      if the PUCCH is not configured for the terminal, initiating a random access procedure to obtain the new shared uplink control channel resource.

2. The method of claim 1, wherein the step of monitoring the Physical Downlink Control Channel (PDCCH) comprises:
   if the new shared uplink control channel resource is not received after the predetermined number of times, releasing the PUCCH.

3. The method of claim 1, wherein the step of initiating the random access procedure comprises:
   aborting the random access procedure if any shared uplink channel resource is received during the random access procedure.

4. The method of claim 1, further comprising:
   repeating the operation until the new shared uplink control channel resource is obtained.

5. A terminal configured to request a scheduling request (SR) for a shared uplink control channel resource in a wireless communication system, the terminal comprising:
   a transmit/receive unit; and
   a processor operatively connected to the transmit/receive unit, the processor configured to determine whether or not the SR is triggered;
      if the SR is determined to be triggered, determine whether or not an existing shared uplink control channel resource is assigned to the terminal's Cell-Radio Network Temporary Identifier (C-RNTI); and if no existing shared uplink control channel resource is determined to be available, perform the following operation:
- determine whether or not a Physical Uplink Control Channel (PUCCH) is configured for the terminal;
- if the PUCCH is configured for the terminal, send the SR via the PUCCH for a predetermined number of time, and monitoring a Physical Downlink Control Channel (PDCCH) for a new shared uplink control channel resource that is assigned to the terminal's C-RNTI; and
- if the PUCCH is not configured for the terminal, initiate a random access procedure to obtain the new shared uplink control channel resource.

6. The terminal of claim 5, wherein, if the new shared uplink control channel resource is not received after the predetermined number of times, the processor is configured to release the PUCCH.

7. The terminal of claim 5, wherein the processor is configured to abort the random access procedure if any shared uplink channel resource is received during the random access procedure.

8. The terminal of claim 5, wherein the processor is configured to repeat the operation until the new shared uplink control channel resource is obtained.

* * * * *